(12) United States Patent
Ichikawa

(10) Patent No.: US 6,833,939 B1
(45) Date of Patent: Dec. 21, 2004

(54) LIGHT SCANNING METHOD AND LIGHT SCANNING DEVICE

(75) Inventor: Junichi Ichikawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 119 days.

(21) Appl. No.: 09/722,452

(22) Filed: Nov. 28, 2000

(30) Foreign Application Priority Data

Feb. 4, 2000 (JP) ...................................... 2000-028462

(51) Int. Cl.$^7$ ............................................ G02B 26/08
(52) U.S. Cl. ................................. 359/204; 359/205
(58) Field of Search ................................. 359/204, 205, 359/206, 216

(56) References Cited

U.S. PATENT DOCUMENTS

| | | | | |
|---|---|---|---|---|
| 4,474,422 A | * | 10/1984 | Kitamura | 359/204 |
| 4,932,734 A | * | 6/1990 | Sakuma et al. | 359/207 |
| 5,008,686 A | * | 4/1991 | Saito | 347/241 |
| 5,251,055 A | * | 10/1993 | Koide | 359/204 |

FOREIGN PATENT DOCUMENTS

| | | |
|---|---|---|
| JP | 1-163717 | 6/1989 |
| JP | 1-180510 | 7/1989 |
| JP | 2-54211 | 2/1990 |
| JP | 2-129614 | 5/1990 |
| JP | 5-294005 | 11/1993 |
| JP | 6-18802 | 1/1994 |
| JP | 6-202019 | 7/1994 |
| JP | 7-199109 | 8/1995 |
| JP | 7-209596 | 8/1995 |
| JP | 8-118725 | 5/1996 |
| JP | 8-297256 | 11/1996 |
| JP | 9-33850 | 2/1997 |
| JP | 9-146030 | 6/1997 |
| JP | 9-274151 | 10/1997 |
| JP | 9-274152 | 10/1997 |
| JP | 9-281421 | 10/1997 |
| JP | 10-68898 | 3/1998 |
| JP | 10-293260 | 11/1998 |
| JP | 10-333069 | 12/1998 |
| JP | 11-84285 | 3/1999 |

* cited by examiner

*Primary Examiner*—Euncha P. Cherry
(74) *Attorney, Agent, or Firm*—Morgan, Lewis & Bockius LLP

(57) ABSTRACT

A laser array and a reflection surface of a rotary polygonal mirror are set in an afocal and conjugate relation by a collimator lens. The reflection surface of the rotary polygonal mirror and a scanning position of a peripheral surface of a photosensitive drum are set in an afocal and conjugate relationship by first and second cylinder mirrors. Therefore, plural light beams emitted from light emission points of the laser array are made incident on and deflected by the reflection surface of the rotary polygonal mirror, in a parallel state and without forming an angle with respect to the subscanning direction. The plural light beams are then incident on the peripheral surface of the photosensitive drum in a parallel state and focused thereon. Accordingly, bow difference and pitch deviation are decreased regardless of an interval between light emission points for output of the respective light beams.

10 Claims, 13 Drawing Sheets

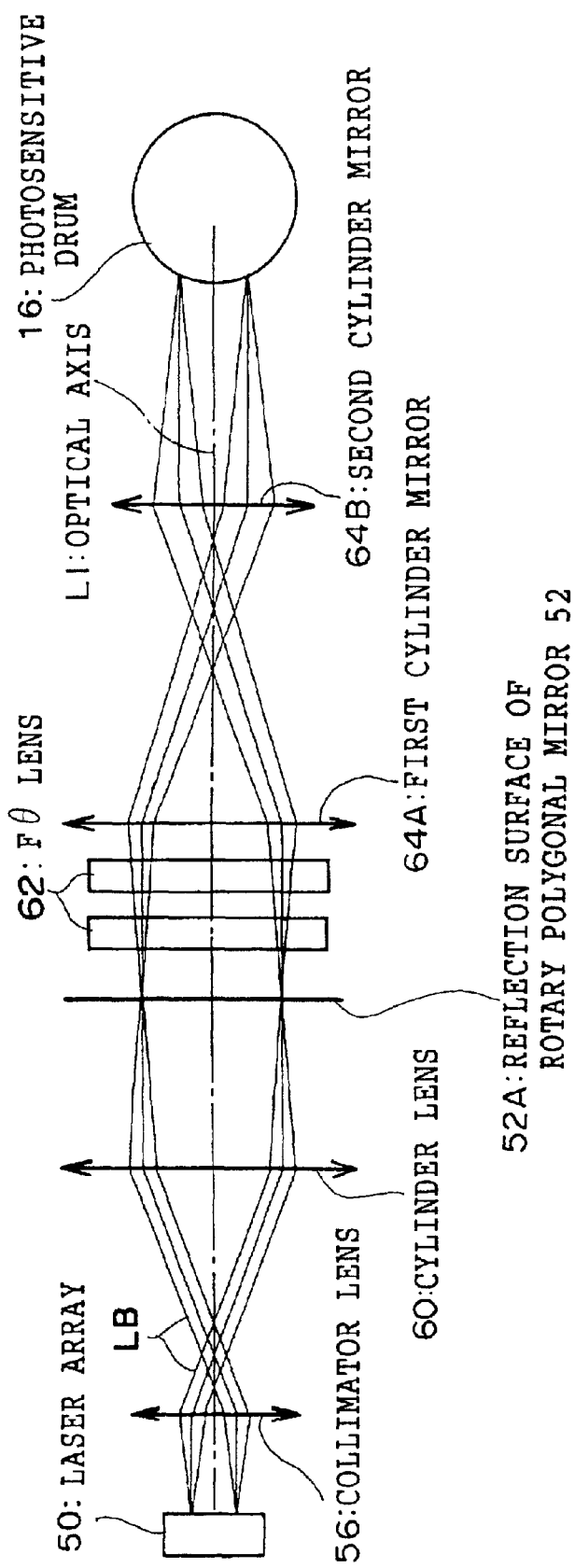
F I G. 4

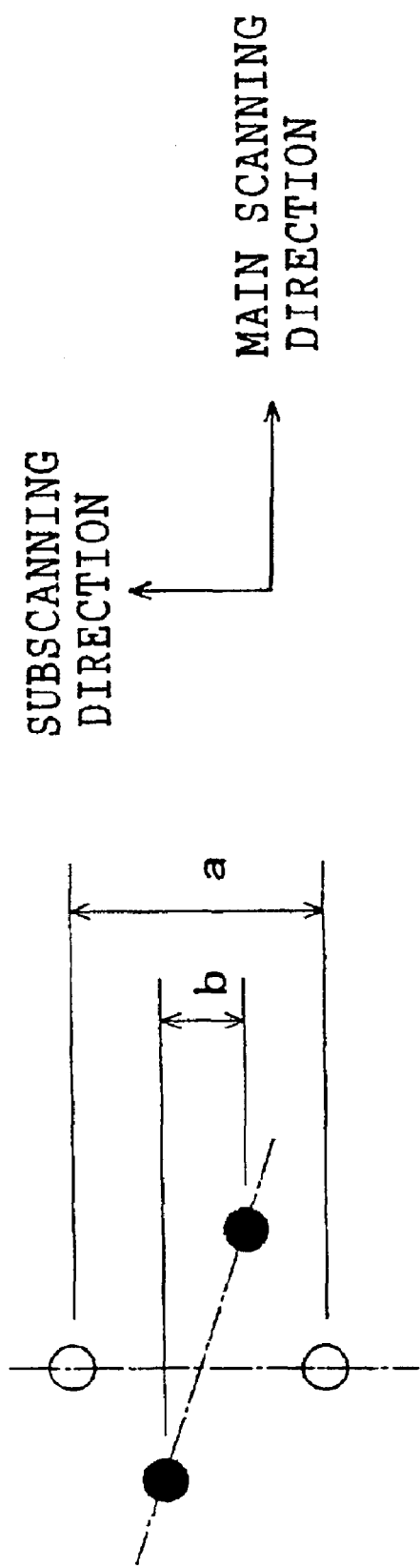

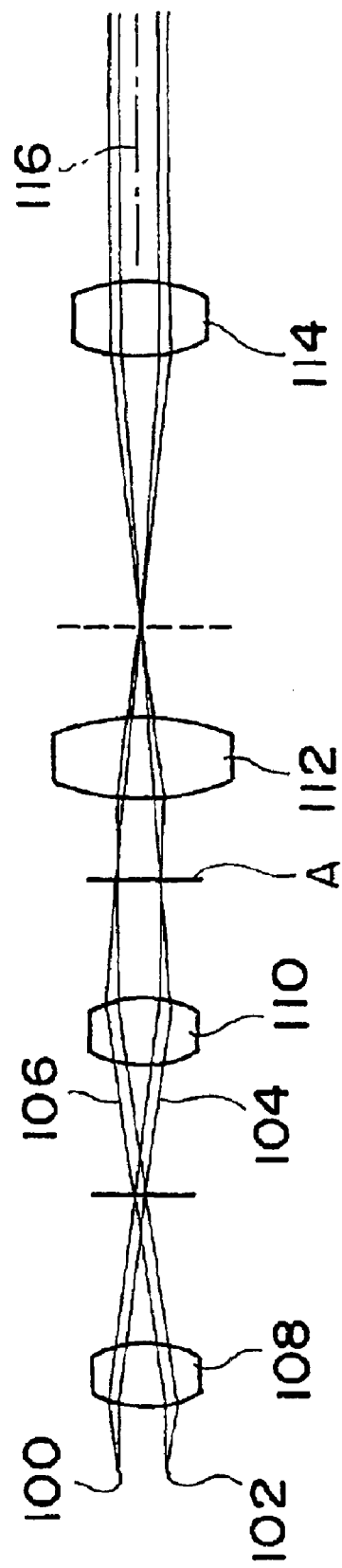

F I G. 1 3
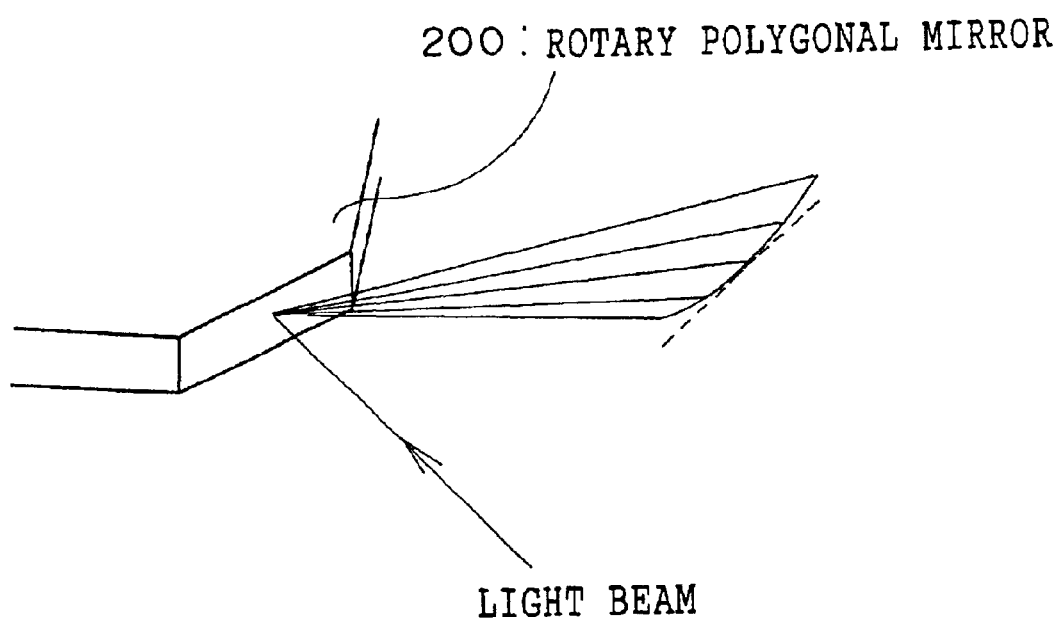

LIGHT SCANNING METHOD AND LIGHT SCANNING DEVICE

BACKGROUND OF THE INVENTION

1. Field of Invention

The present invention relates to a light scanning method and a light scanning device, and more particularly to a light scanning method in a light scanning device which deflects plural light beams emitted from a light source by reflection surfaces of a deflector, and simultaneously main-scans by the plural light beams deflected by the deflector a surface to be scanned, and to a light scanning device.

2. Description of the Related Art

Image recording apparatuses for recording images by light beams such as laser printers and electronic photocopiers are widely used. In such image recording apparatus, a photosensitive material is scanned by a light beam by means of a light scanning device.

In the light scanning device, generally, the light beam emitted from the semiconductor laser is modulated according to image data, and, via a collimator lens or the like, is incident on the reflection surfaces of a rotary polygonal mirror rotating at a predetermined speed.

By rotation of this rotary polygonal mirror, the light beam is deflected while its incident angle is being changed continuously, and the light beams scans the photosensitive material. The light beam reflected by the reflection surfaces of the rotary polygonal mirror is guided to the photosensitive material via an fθ lens, a cylinder mirror (or cylinder lens), and the like, and scans the photosensitive material at a constant speed and is focused on the photosensitive material. As a result, an image is exposed and recorded on the photosensitive material.

Recently, to meet the need for higher speeds of image forming apparatus, improvements in the scanning speed of the light scanning device have been desired. As a technology for improving the speed of a light scanning device, the simultaneous scanning method has been known in which plural scanning lines are scanned simultaneously by one scanning by using plural light beams.

In designing the optical system of the light scanning device of this simultaneous scanning system (hereinafter called plural-beam scanning optical system), the bow difference and pitch deviation between the plural light beams must be considered. FIG. 9 shows bow difference occurring in the case of scanning with two light beams, and FIG. 10 shows pitch deviation when scanning with two light beams. In the diagrams, the broken line indicates an ideal scanning line position, and the solid line represents an actual scanning line position.

The bow difference means changes in the interval between two light beams in the subscanning direction depending on the scanning position in the main scanning direction, due to a difference in the curvature of the scanning lines formed by the light beams. The pitch deviation means widening or narrowing of the interval between scanning lines when two light beams are scanned simultaneously in a state in which the interval in the subscanning direction between the light beams deviates from a prescribed value. When scanning plural scanning lines simultaneously in one scanning by using plural light beams, if such bow difference or pitch deviation occurs, the image becomes uneven in the subscanning direction, and the image quality is lowered. Such bow difference and pitch deviation must be suppressed in order to obtain image output of high image quality.

Generally, bow difference and pitch deviation are more likely to occur the further the plural beams are apart from the optical axis of the optical system. Conventionally, the plural beams were usually only two or at most four beams which were arranged in a row. When the light emitting points outputting the respective light beams were arranged in a row at the light source, even if the interval between the actual light emission points was wide (see distance "a" in FIG. 11), by inclining the entire light source obliquely in the subscanning direction, the interval between light emission points in the subscanning direction could be apparently narrowed (see distance "b" in FIG. 11), and deviation of the plural beams from the light source could be kept small. It was therefore relatively easy to decrease the bow difference and pitch deviation.

However, when the number of beams was further increased to further improve the speed, if the bow difference and pitch deviation were decreased by inclining the light source in the subscanning direction, on the contrary, the problem arose that the plural beams were widely apart in the mainscanning direction. Specifically, when the plural beams were apart in the main scanning direction, since the timing of each beam scanning a same point in the main scanning direction was different, the required buffer memory capacity for aligning the pixel positions in the main scanning direction increased, and a problem arose that the width of the reflection surfaces of the rotary polygonal mirror in the main scanning direction had to be increased substantially.

According to the technology disclosed in Japanese Patent Application Laid-Open (JP-A) No.5-294005, by disposing beams in a two-dimensional arrangement by using a VCSEL (Vertical Cavity Surface Emitting Laser Diode) as the light source, even if the number of beams is increased, the beams are prevented from greatly moving away from the optical axis of the optical system. However, in the case of the light source having light emission points disposed in a two-dimensional arrangement, unlike the conventional one-row arrangement light source, the interval between light emission points in the subscanning direction cannot be apparently narrowed by inclining the entire light source, and hence it is desired to solve the problems of bow difference and pitch deviation optically. So far, several methods have been proposed for reducing the bow difference or pitch deviation optically.

Technology for Reducing Bow Difference

1) Using a f sin θ lens: JP-A No. 1-163717

2) Reducing the subscanning direction lateral magnification rate of an optical system: JP-A No. 2-54211, JP-A No. 9-281421

3) Canceling mutual bow differences occurring at plural positions: JP-A No. 2-129614, JP-A No. 8-118725

4) Specifying intersecting positions of plural beams: JP-A No. 6-18802, JP-A No. 7-209596, JP-A No. 9-274152

5) Limiting tolerance of bow difference: JP-A No. 6-202019

6) Balancing subscanning direction image plane curvature and bow difference: JP-A No. 7-199109

7) Using an aspherical lens: JP-A No. 1-180510, JP-A No. 8-297256, JP-A No. 9-33850, JP-A No. 9-146030, JP-A No.10-333069, JP-A No. 11-84285

8) Aligning plural beams in the bow direction: JP-A No. 10-68898, JP-A No. 10-293260

Technology for Reducing Pitch Deviation

1) Making plural beams incident, in parallel, onto the surface to be scanned: JP-A No. 7-209596, JP-A No. 9-274151

Thus, various technologies for reducing either one of bow difference and pitch deviation have been proposed, but in an actual light scanning device of a simultaneous scanning system, both bow difference and pitch deviation must be suppressed. Of the aforementioned technologies, only the technology disclosed in JP-A No. 7-209596 refers to both bow difference and pitch deviation.

The technology disclosed in JP-A No. 7-209596 is as shown in FIG. 12. Light beams 104, 106 emitted from laser diodes 100, 102 are incident on a rotary polygonal mirror A through a collimator lens 108 and a cylindrical lens 110. After the light beams 104, 106 incident on the rotary polygonal mirror A are reflected by the reflection surfaces of the rotary polygonal mirror A, they pass through an anamorphic motion compensation optical system (MCO) 112, 114 having an fθ lens, a cylindrical lens, and a cylindrical mirror, and leave the light scanning device in a state parallel to the system axis (optical system optical axis) 116. That is, occurrence of bow difference and pitch deviation is suppressed by making the main exit beam of the light scanning device have a telecentric profile.

The cause of occurrence of bow difference in the plural-beam scanning optical system is, as mentioned above, that the light beam does not pass through the optical axis of the light beam. More specifically, the following two factors exist.

Light beams are incident on a rotary polygonal mirror 200 at an angle with respect to the subscanning direction (see FIG. 13).

Light beams pass outside of the optical axis of an fθ lens 202 when passing through the fθ lens 202 having power in the subscanning direction, or the beams enter the fθ lens 202 at an angle with respect to the subscanning direction (see FIG. 14).

In the technology disclosed in JP-A No. 7-209596, the interval between the light emission points (interval between laser diodes 100, 102) of the semiconductor laser array used as the light source is as narrow as 25 μm. Thus, there is no need to consider the angle in the subscanning direction on the rotary polygonal mirror A of the two light beams 104, 106 and the fθ lens of the anamorphic motion compensation optical system 112, 114, and both bow difference and pitch deviation can be decreased.

However, as is clear from FIG. 12, since the two light beams 104, 106 are incident on the rotary polygonal mirror A at different angles in the subscanning direction, when the interval between light emission points in the subscanning direction is large, the incident angle in the direction of the light beam on the rotary polygonal mirror A is large, and a bow difference occurs due to deflection by the rotary polygonal mirror A. Further, since the light beams 104, 106 are incident at an angle outside of the optical axis of the fθ lens (the anamorphic motion compensation optical system), if the interval between light emission points is large, similarly, a bow difference occurs.

SUMMARY OF THE INVENTION

The present invention has been devised to solve the above problems, and it is an object thereof to present a light scanning method and light scanning device capable of decreasing the bow difference and pitch deviation, regardless of the interval in the subscanning direction between light emission points for output of beams, when scanning simultaneously by using plural beams.

To achieve this object, a first aspect of the invention is a light scanning method comprising the steps of: (a) making plural light beams emitted from a light source incident at least onto reflection surfaces of a deflector in a mutually parallel state in a direction orthogonal to a main scanning direction; (b) deflecting the plural light beams by the deflector; and (c) focusing the plural light beams deflected by the deflector on a surface to be scanned, with an afocal relation between the reflection surfaces of the deflector and the surface to be scanned in the direction orthogonal to the main scanning direction.

A second aspect of the invention is a light scanning device which deflects plural light beams emitted from a light source by making the light beams incident on reflection surfaces of a deflector, and scans the surface to be scanned simultaneously by the plural light beams deflected by the deflector, the device comprising: (a) a first optical system for making the plural light beams incident at least onto the reflection surfaces of the deflector in a mutually parallel state in a direction orthogonal to a main scanning direction; and (b) a second optical system for focusing the plural light beams, which were deflected by the deflector, onto a surface to be scanned, with an afocal relation between the reflection surfaces of the deflector and the surface to be scanned in the direction orthogonal to the main scanning direction.

According to the first and second aspects of the invention, in the direction orthogonal to the main scanning direction (hereinafter called the subscanning direction), plural light beams are incident on the reflection surfaces of the deflector in a mutually parallel state (the light beams are not parallel light, but have the same advancing direction). That is, when the plural light beams are incident on the reflection surfaces of the deflector, their optical axes are mutually parallel in the subscanning direction, thereby preventing occurrence of bow difference due to deflection by the deflector.

Moreover, since the reflection surfaces of the deflector and the surface to be scanned are in an afocal relation (light beams are incident thereon and exit therefrom in a parallel state), the plural light beams deflected by the deflector are incident on the surface to be scanned in a parallel state. Thus, by setting such an afocal relation, for example, when the light beams pass through an fθ lens, occurrence of bow difference from the reflection surfaces of the deflector until the light beams are incident on the surface to be scanned can be suppressed, and also occurrence of pitch deviation at times when there is fluctuation in the distance between the reflection surfaces of the deflector and the surface to be scanned can be suppressed.

That is, according to the first and second aspects of the invention, occurrence of bow difference and pitch deviation at the time of scanning the surface to be scanned simultaneously by plural light beams can be suppressed (or decreased).

In a third aspect of the invention, the light source emits the plural light beams in a mutually parallel state, and the first optical system may sets an afocal and conjugate relation between the light source and the reflection surfaces of the deflector.

In this case, the first optical system comprises a collimator lens for making the light beams emitted from the light source as divergent luminous flux into substantially parallel luminous flux, and a cylinder lens having power for condensing in the direction orthogonal to the main scanning direction, and focusing the light beams made into substantially parallel luminous flux by the collimator lens as a line which is long in the main scanning direction on the reflection surfaces of the deflector. The collimator lens and cylinder lens may be disposed such that the focal position at the light beam advancing direction downstream side of the collimator lens substantially coincides with the focal position at the light beam advancing direction upstream side of the cylinder lens.

For correcting the tilt of the reflection surfaces of the deflector simultaneously, the second optical system may focus the plural light beams deflected by the deflector on the surface to be scanned while setting a conjugate relation between the reflection surfaces of the deflector and the surface to be scanned.

In this case, the second optical system comprises an fθ optical system having power for condensing only in the main scanning direction, a first cylinder optical system having power for condensing in the direction orthogonal to the main scanning direction, and a second cylinder optical system having power for condensing in the direction orthogonal to the main scanning direction. The first cylinder optical system and second cylinder optical system are disposed such that the focal position at the light beam advancing direction downstream side of the first cylinder optical system substantially coincides with the focal position at the light beam advancing direction upstream side of the second cylinder optical system.

The power of the first cylinder optical system for condensing in the direction orthogonal to the main scanning direction may be smaller than the power of the second cylinder optical system for condensing in the direction orthogonal to the main scanning direction.

The light source may be a VCSEL array having plural light emission points disposed in a two-dimensional arrangement.

Therefore, the present invention results in the excellent effect of decreasing the bow difference and pitch deviation, regardless of the subscanning direction interval of light emission points for output of beams, when scanning simultaneously by using plural beams.

BRIEF DESCRIPTION OF THE DRAWINGS

FIG. 4 is a block diagram showing an optical system of the light scanning device according to the embodiment of the present invention (an optical system from the laser array to a photosensitive drum in a case in which two cylinder mirrors are used).

FIG. 11 is a diagram for explaining a technique (of a prior art) for decreasing the bow difference and pitch deviation when using a light source having light emission points arranged in a row.

FIG. 12 is a block diagram showing a structure of an optical system for optically decreasing the bow difference and pitch deviation in the prior art.

FIG. 13 is a diagram for explaining factors for causing bow difference due to deflection by a rotary polygonal mirror.

DETAILED DESCRIPTION OF THE PREFERRED EMBODIMENT

Figure 1:
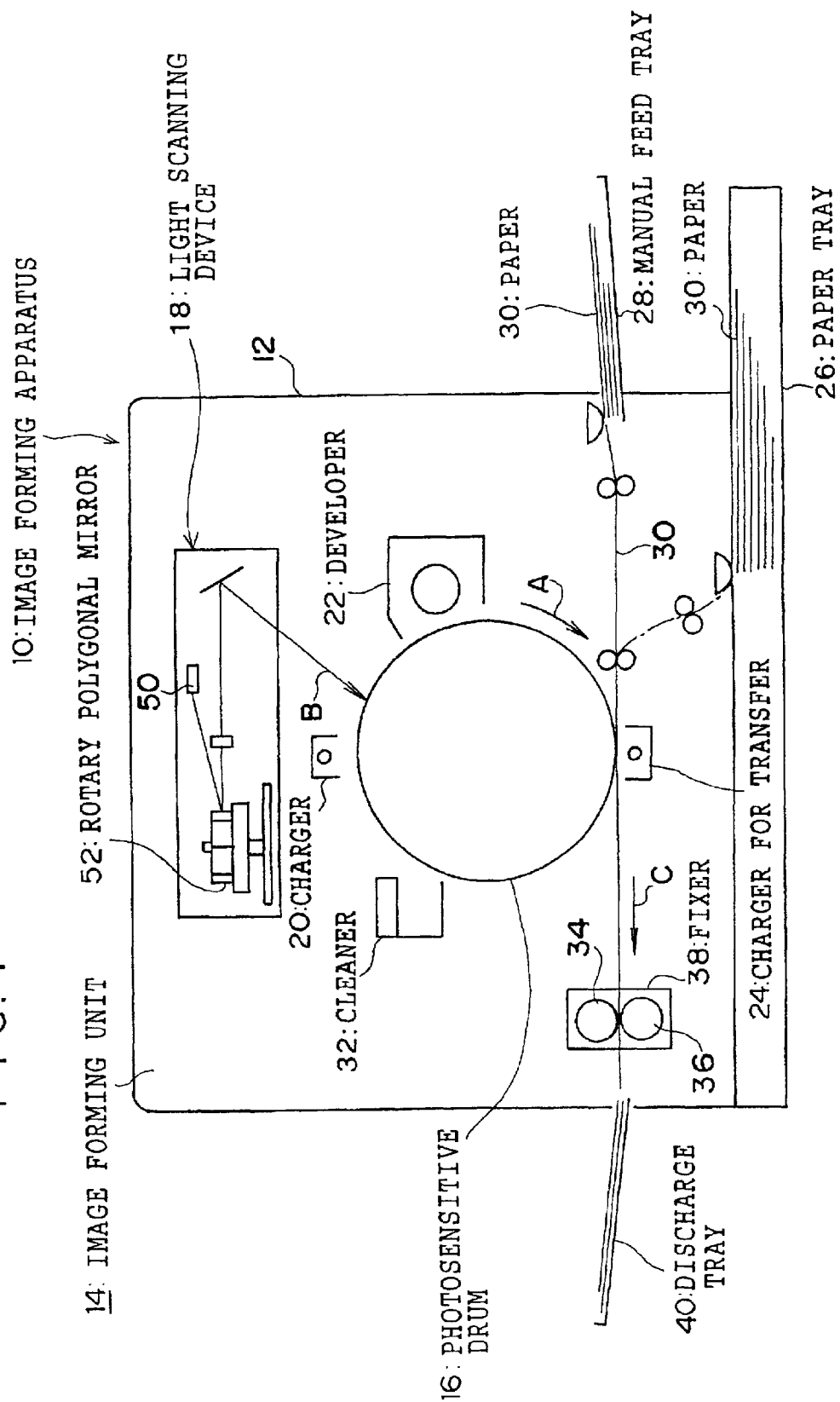
FIG. 1 is a schematic structural diagram of an image forming apparatus comprising a optical scanning system according to an embodiment of the present invention.

Referring now to the drawings, an example of a preferred embodiment of the present invention is described in detail below.

FIG. 1 shows a schematic structure of image forming apparatus 10. As shown in FIG. 1, the image forming apparatus 10 is covered with a casing 12.

An image forming section 14 is disposed in the casing 12. The image forming section 14 includes a cylindrical photosensitive drum 16 rotating at a constant speed in the direction of arrow A shown in FIG. 1, and a light scanning device 18 for emitting light beams, while scanning, toward the photosensitive drum 16 (see arrow B in FIG. 1) on the basis of desired image data (gray scale image data in the present embodiment in which the image forming apparatus 10 is designed to form monochromatic images).

A charger 20 is disposed in a vicinity of the peripheral surface of the photosensitive drum 16. The charger 20 charges the photosensitive drum 16 uniformly. The photosensitive drum 16 uniformly changed by the charger 20 rotates in the direction of arrow A, and is irradiated with light beams from the light scanning device 18. Thus, a latent image is formed on the peripheral surface of the photosensitive drum 16.

In the rotating direction of the photosensitive drum 16, at the downstream side from the position of irradiating light beams by the light scanning device 18, a developer 22 for supplying toner to the photosensitive drum 16 is disposed, facing the circumferential surface of the photosensitive drum 16. The toner supplied from the developer 22 is applied to the portions irradiated with light beams from the light scanning device 18 As a result, a toner image is formed on the peripheral surface of the photosensitive drum 16.

In the rotating direction of the photosensitive drum 16, at the downstream side from the location of the developer 22 (a position beneath the axial center of the photosensitive drum 16), a charger for transfer 24 is disposed, facing the circumferential surface of the photosensitive drum 16. This charger for transfer 24 transfers the toner image formed on the circumference of the photosensitive drum 16, onto paper 30 guided in between the photosensitive drum 16 and charger for transfer 24 from a paper tray 26 or manual feed tray 28.

In the rotating direction of the photosensitive drum 16, at the downstream side from the location of the charger for transfer 24, a cleaner 32 is disposed, facing the circumferential surface of the photosensitive drum 16. By this cleaner 32, the toner remaining on the circumference of the photosensitive drum 16 after transfer is removed.

The paper 30 on which the toner image is transferred is conveyed in the direction of arrow C. In the conveying direction of the paper 30 at the downstream side from the photosensitive drum 16, a fixer 38 including a pressing roller 34 and a heating roller 36 is disposed. The fixer 38 heats and presses the conveyed paper 30 having the toner image transferred thereon, and fuses and fixes the toner. That is, by fixing process at the fixer 38, a desired image is recorded on the paper 30. After the fixing process and recording of image, the paper 30 is discharged into a discharge tray 40.

Figure 2:
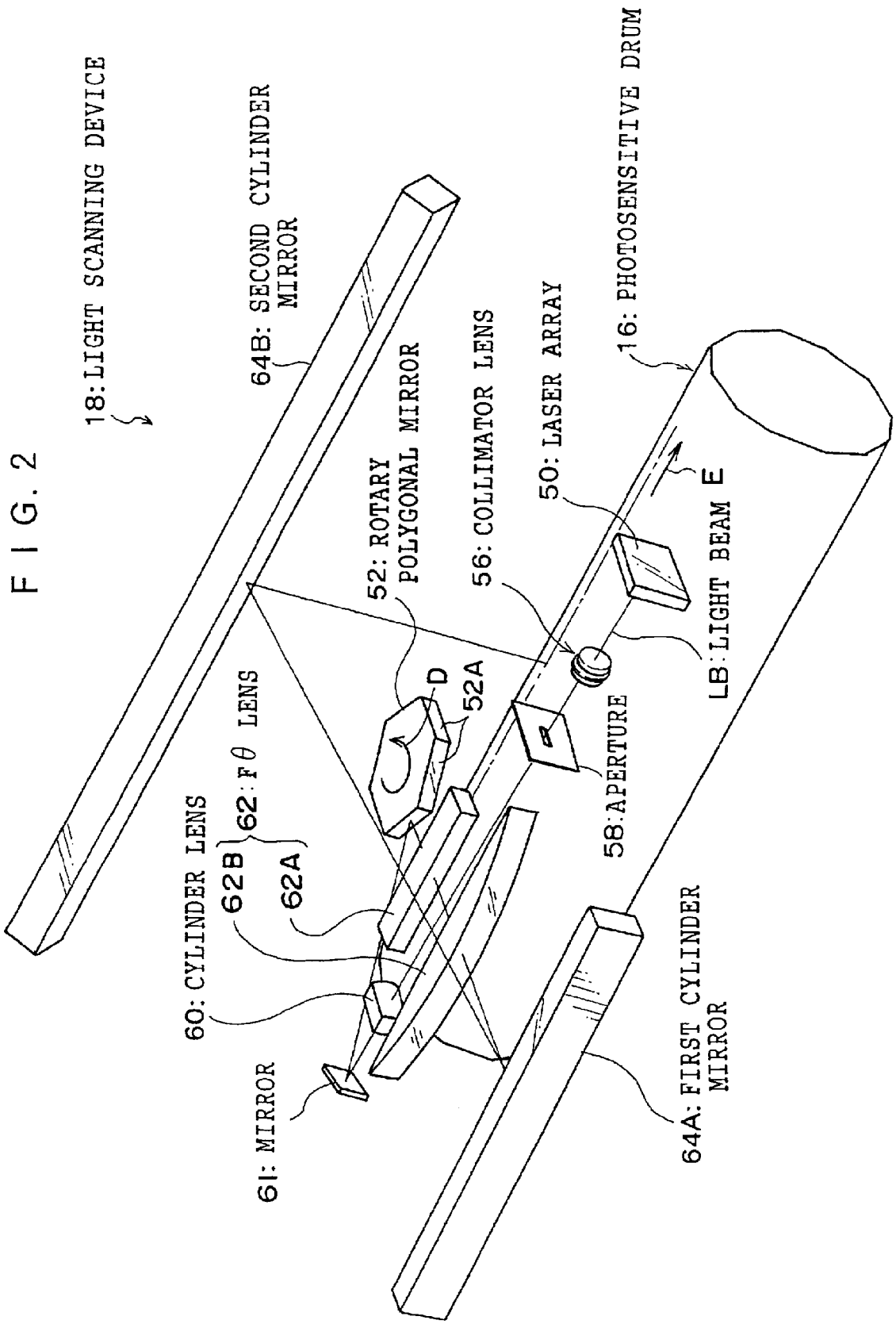
FIG. 2 is a perspective view showing details of the structure of the light scanning device according to the embodiment of the present invention.

The structure of the light scanning device is further described below. FIG. 2 shows a detailed structure of the light scanning device 18.

As shown in FIG. 2, the light scanning device 18 has a semiconductor laser in array form (laser array) 50. As the deflector, there is a rotary polygonal mirror 52 of a regular polygonal shape (a regular hexagon in the present embodiment) having plural reflection surfaces 52A provided at the side surfaces thereof. The rotary polygon mirror 52 is rotated at high speed in the direction of arrow D by a motor (not shown in the drawings).

Figure 3:
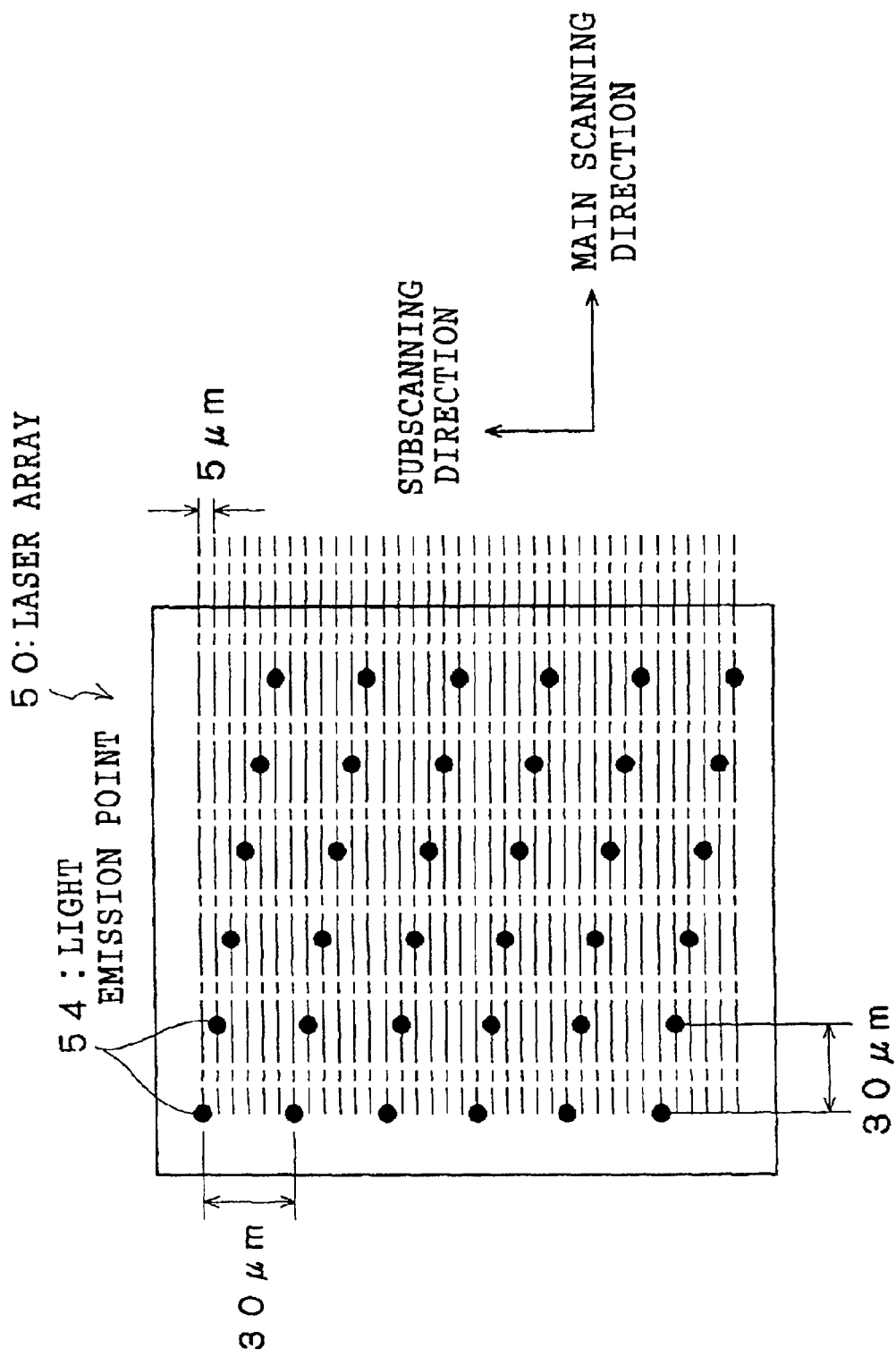
FIG. 3 is a diagram showing an example of an arrangement of light emission points in a laser array.

The laser array 50 is a VCSEL having plural light emission points 54 disposed in a two-dimensional arrangement. FIG. 3 shows an example of this laser array 50. As shown in FIG. 3, the laser array 50 consists of a total of 36 light emission points 54 disposed in a two-dimensional arrangement, that is, six in the main scanning direction and six in the subscanning direction at specific intervals. The light emission points 54 arranged in the main scanning direction are shifted by one step each in the subscanning direction, which one step is equal to the distance between two light emission points 54 adjacent in the subscanning direction divided into six equal sections. That is, as far as the subscanning direction is concerned, a light emission point 54 is disposed at each step. By thus shifting the light emission points 54 in the subscanning direction, all light emission points 54 can scan different scanning lines (so that 36 scanning lines can be scanned simultaneously).

From each light emission point 54 of the laser array 50, a light beam LB modulated according to desired image data is emitted. Since the laser array 50 is a VCSEL, plural light beams LB are emitted in parallel (not as parallel light, but as light beams having the same advancing direction).

At the downstream side in the advancing direction of the plural light beams LB emitted from the light emission points 54, as shown in FIG. 2, a collimator lens 56, an aperture 58, a cylinder lens 60, and a mirror 61 are disposed sequentially. The plural light beams LB emitted from the light emission points 54 pass through the collimator lens 56, aperture 58, cylinder lens 60, and mirror 61, and reach the rotary polygonal mirror 52.

The collimator lens 56 transforms the plural light beams LB emitted from the light emission points 54 from divergent light to substantially parallel light, and converges the light beams to intersect at the focal position at the image side of the collimator lens 56 (light beams advancing direction downstream side).

The aperture 58 is disposed at the image side focal position of the collimator lens 56. The plural light beams LB transformed into substantially parallel light by the collimator lens 56 pass through the aperture 58, and are shaped at the same time. At the location of the aperture 58, since all light beams LB intersect, shaping by the aperture 58 is the same for all light beams LB.

The cylinder lens 60 has power only in the subscanning direction, and the plural light beams LB converge in the subscanning direction individually by the cylinder lens 60, and are reflected by the mirror 61, and guided to the rotary polygonal mirror 52.

The cylinder lens 60 is also disposed such that the object side (light beam advancing direction upstream side) focal position of the cylinder lens coincides with the location of the aperture 58, and such that the image side focal position is located on the reflection surface 52A of the rotary polygonal mirror 52.

By disposing the cylinder lens 60 in this way, the laser array 50 and the reflection surface 52A of the rotary polygonal mirror 52 are set in an afocal and conjugate relation in the subscanning direction. Therefore, the plural light beams LB are individually focused as linear images on the reflection surface 52A of the rotary polygonal mirror 52 in the subscanning direction, and also are incident, in parallel in the subscanning direction, on the reflection surface 52A of the rotary polygonal angle 52 without forming an angle in the subscanning direction with respect to the reflection surface 52A of the rotary polygonal mirror 52.

The plural light beams incident on the rotary polygonal mirror 52 are deflected by rotation of the rotary polygonal mirror 52 while the incident angle of the light beams on each reflection surface 52A is changed continuously. As a result, the plural light beams LB are emitted while scanning the surface of the photosensitive drum 16 simultaneously in the direction of arrow E (main scanning direction).

In the advancing direction of the light beams LB reflected by the reflection surfaces 52A of the rotary polygonal mirror 52, there is an fθ lens 62 composed of first lens 62A and second lens 62B, having power only in the main scanning direction. By this fθ lens 62, the scanning speed becomes uniform when the photosensitive drum 15 is irradiated with each light beam LB.

At the downstream side in the advancing direction of the light beam from the fθ lens 62, a first cylinder mirror 64A having power only in the subscanning direction is disposed. In the reflecting direction of the light beam LB by the first cylinder mirror 64A, a second cylinder mirror 64B having power only in the subscanning direction is disposed. By the first cylinder mirror 64A and second cylinder mirror 54B, each light beam LB is guided to the photosensitive drum 16, and focused on the circumferential surface of the photosensitive drum 16.

The first cylinder mirror 64A and second cylinder mirror 64B are disposed so that the image side focal position of the first cylinder mirror 64A and the object side focal position of the second cylinder mirror 64B coincide with each other (that is, the optical path length between the two mirrors is the sum of the focal length of the first cylinder mirror and the focal length of the second cylinder mirror). Thus, the reflection surface 52A of the rotary polygonal mirror 52 and the scanning position on the peripheral surface of the photosensitive drum 16 are in an afocal and conjugate relation in the subscanning direction.

However, the first cylinder mirror 64A and second cylinder mirror 64B are both required to have a positive power (that is, a condensing power, and the greater this power, the shorter is the focal length). In a positive-negative or negative-positive combination, an afocal and conjugate relation cannot be established. Note that in the following explanation, both the cylinder mirror 64A and the cylinder mirror 64B are called the cylinder mirror 64 if it is not required to distinguish between the first and second cylinder mirrors 64A, 64B particularly.

The operation of the present embodiment is explained below with reference to FIG. 4.

Plural (36 arranged in the subscanning direction) light beams emitted from the light emission points 54 of the laser array 50 are made into substantially parallel light by means of the collimator lens 56, shaped by the aperture 58, and converge in the subscanning direction by means of the cylinder lens 60, and are incident on the reflection surfaces 52A of the rotary polygonal mirror 52. The plural light beams incident on the rotary polygonal mirror 52 are deflected by rotation of the rotary polygonal mirror 52.

At this time, since the laser array 50 and reflection surface 52A of the rotary polygonal mirror 52 are in an afocal and conjugate relation, the plural light beams emitted from the light emission points 54 are incident on the reflection surfaces 52A of the rotary polygonal angle 52, in a mutually parallel state (in the same advancing direction), and without forming an angle in the subscanning direction with respect to the reflection surfaces 52A of the rotary polygonal mirror 52. That is, the plural light beams are incident on the reflection surfaces 52A of the rotary polygonal mirror 52 in a manner parallel to the optical axis L1 of the optical system of the light scanning device 18. As a result, occurrence of bow difference due to deflection of the light beams LB on the rotary polygonal mirror 52 can be suppressed.

The plural light beams LB deflected by rotation of the rotary polygonal mirror 52 enter the fθ lens 62 in a mutually parallel state. The plural light beams LB entering the fθ lens 62 are controlled to have an uniform scanning speed when the light beams are scanned onto the peripheral surface of the photosensitive drum 16. This fθ lens 62 has power only in the main scanning direction, and bow difference is not caused if the plural light beams LB pass through the fθ lens 62.

The plural light beams passing through the fθ lens 62 are focused on the circumferential surface of the photosensitive drum 16 by the first cylinder mirror 64A and second cylinder mirror 64B having power only in the subscanning direction. That is, the plural light beams LB are focused on the circumferential surface of the photosensitive drum 16 without bow difference arising.

Figure 5:
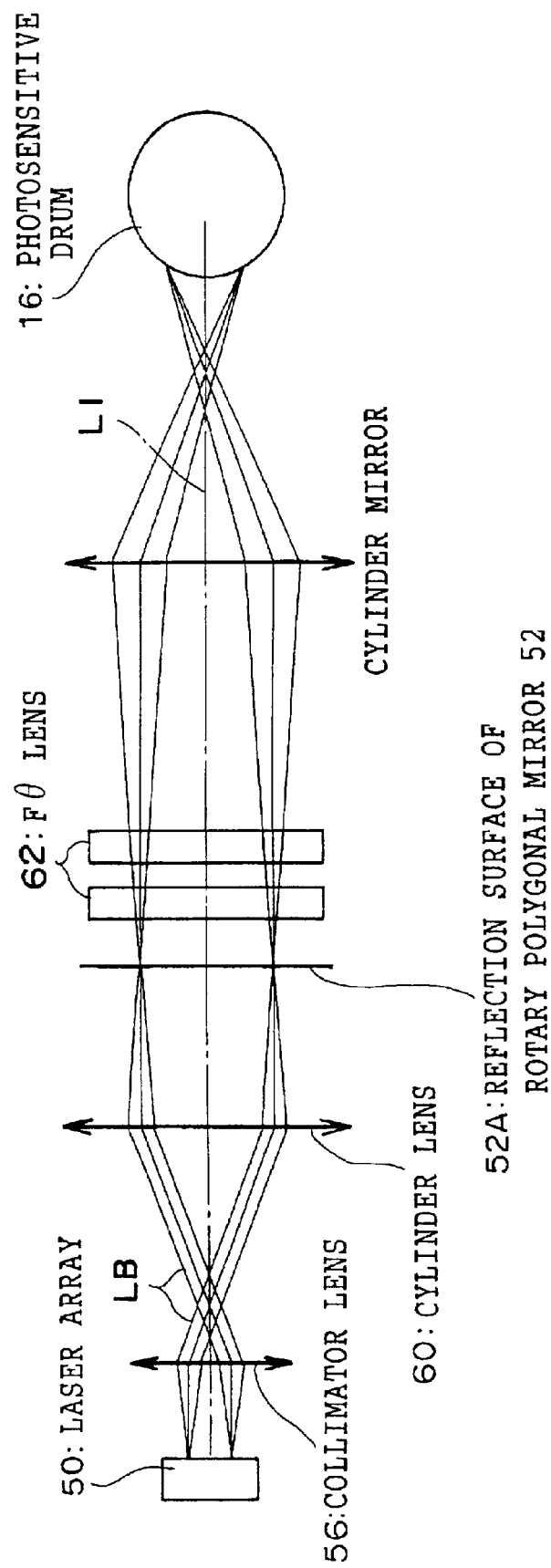
FIG. 5 is a block diagram showing an example of an optical system from the laser array to the photosensitive drum in a case in which one cylinder mirror is used.

When focusing by one cylinder mirror only, as shown in FIG. 5, since plural beams are incident on the photosensitive drum 16 in a non-parallel state, pitch deviation may occur due to fluctuations in the distance between the peripheral surface of the light scanning device 18 and photosensitive drum 16. However, as mentioned above, by using two cylinder mirrors, that is, the first cylinder mirror 64A and second cylinder mirror 64B, since the reflection surface 52A of the rotary polygonal mirror 52 and the scanning position of the circumferential surface of the photosensitive drum 16 are in an afocal relation, the plural beams are incidennt on the circumferential surface of the photosensitive drum 16 in a parallel state, and occurrence of pitch deviation can be suppressed.

Thus, according to the present embodiment, an images of 36 scanning lines can be written by scanning the circumferential surface of the photosensitive drum 16 simultaneously with 36 light beams, while suppressing occurrence of bow difference and pitch deviation.

Further, in order to correct the tilt error of the plural reflection surfaces 52A of the rotary polygonal mirror 52 (that is, to correct the plane tilt), generally, a conjugate relation is set between the reflection surface 52A of the rotary polygonal mirror 52 and the scanning position on the circumferential surface of the photosensitive drum 16. In this case, this conjugate relation is satisfied at the same time. That is, plane tilt correction can be achieved simultaneously.

The writing density (scanning line interval) at this time is explained hereinafter by use of specific numerical examples. In the present embodiment, the laser array 50 is used in which a total of 36 (=6×6) light emission points 54 are disposed in two-dimensional arrangement, consisting of six at intervals of 30 μm in the main scanning direction and six at intervals of 30 μm in the subscanning direction. The light emission points 54 arranged in the main scanning direction are shifted by 5 μm each in the subscanning direction. That is, in the subscanning direction, the light emission points 54 are disposed at intervals of 5 μm, and 36 light beams LB are emitted from the laser array 50 at intervals of 5 μm in the subscanning direction.

In this laser array 50, the light emission point interval between both ends of the subscanning direction is 180 μm. That is, the distance between the both end beams is 180 μm. This is a value with which it is difficult to decrease the bow difference and pitch deviation simultaneously in the optical system in the prior art.

The focal length of the collimator lens 56 is 25 mm and the focal length of the cylinder lens is 100 mm. Therefore, when the light beams are incident on the rotary polygonal mirror 52, the beam interval of the plural beams in the subscanning direction is multiplied by four (=100/25).

The optical path length between the rotary polygonal mirror 52 and the photosensitive drum 16 is 360 mm, and the relation with the focal length of the first cylinder mirror 64A and second cylinder mirror 54B disposed therebetween is as shown in Table 1.

TABLE 1

| Focal length of first cylinder mirror (mm) | Focal length of second cylinder mirror (mm) | Conjugate magnification | Optical path length between rotary polygonal mirror and first cylinder mirror (mm) | Optical path length between first and second cylinder mirrors (mm) | Optical path length between second cylinder mirror and photosensitive drum (mm) |
|---|---|---|---|---|---|
| 130 | 68.77 | −0.529 | 78.2 | 198.8 | 83.0 |

As shown in Table 1, since the conjugate magnification between the rotary polygonal mirror 52 and the photosensitive drum 16 is 0.529 (=68.77/130), the multiplication in the subscanning direction of the entire optical system of the light scanning device 18 is 2.116 (=4×0.529). Therefore, when the plural light beams emitted from the laser array at the subscanning direction interval of 5 μm are focused on the photosensitive drum 16, the image can be written at intervals of 10.58 (=5×2.116), that is, 2400 dpi (image writing density in subscanning direction).

Thus, in the present embodiment, if the subscanning direction distance between plural beams emitted from the light source is long (180 μm), the bow difference and pitch deviation can be suppressed, and the image can be written at high speed and high writing density (240 dpi) by scanning simultaneously with plural light beams.

The cylinder mirror 64 (especially the second cylinder mirror 64B) is disposed after the rotary polygon mirror 52 in the direction in which light advances, and reflects the deflected and scanned light beams, and is hence large in length. For reducing the size of the light scanning device 18, it is desired to shorten the length of the cylinder mirror 64, and it is necessary for this purpose to dispose the cylinder mirror 64, especially the second cylinder mirror 64B, apart from the photosensitive drum 16 as far as possible.

Besides, if the second cylinder mirror 64B is close to the photosensitive drum 16, the beam diameter on the mirror is small, and flaws or stains on the mirror surface may have effects on the focusing state of the light beams LB (flaws or stains appear in an enlarged manner). To decrease the effects of flaws or stains, it is preferred that the second cylinder mirror 64B be disposed apart from the photosensitive drum 16 as far as possible. On the other hand, for reducing the size of the image forming apparatus 10, it is desired that the light scanning device 18 and the photosensitive drum 16 be disposed as closely to each other as possible, and there may be a limit to the distance (the optical path length) between the rotary polygonal mirror 52 and the photosensitive drum 16.

Accordingly, without changing the distance (optical path length) between the rotary polygonal mirror 52 and the photosensitive drum 16 and the conjugate magnification (writing density in the subscanning direction), examples of changing the distance (optical path length) between the second cylinder mirror 64B and the photosensitive drum 16 are shown in Table 2. In the examples shown in Table 2, the optical path length between the rotary polygonal mirror 52 and the photosensitive drum 16 is 360 mm, and the conjugate magnification between the rotary polygonal mirror 52 and photosensitive drum 16 is −0.5.

TABLE 2

| No | Focal length of first cylinder mirror (mm) | Focal length of second cylinder mirror (mm) | Conjugate magnification | Optical path length between rotary polygonal mirror and first cylinder mirror (mm) | Optical path length between first and cylinder mirrors (mm) | Optical path length between second cylinder mirror and photosensitive drum (mm) |
| --- | --- | --- | --- | --- | --- | --- |
| 1 | 100 | 50 | −0.5 | 180.346633 | 150 | 29.65337 |
| 2 | 110 | 55 | −0.5 | 150.346633 | 165 | 44.65337 |
| 3 | 120 | 60 | −0.5 | 120.346635 | 180 | 59.65337 |
| 4 | 130 | 65 | −0.5 | 90.346638 | 195 | 74.65336 |
| 5 | 140 | 70 | −0.5 | 60.346641 | 210 | 89.65336 |
| 6 | 150 | 75 | −0.5 | 30.346644 | 225 | 104.6534 |

In Table 2, in example No. 3, the focal length (120 mm) of the first cylinder mirror 64A and the optical path length (120.346635 mm) between the rotary polygonal mirror 52 and first cylinder mirror 64A are substantially equal to each other. Further, the focal length (60 mm) of the second cylinder mirror 64B and the optical path length (59.6533 mm) between the second cylinder mirror 64B and the photosensitive drum 16 are substantially equal to each other.

Figure 6:
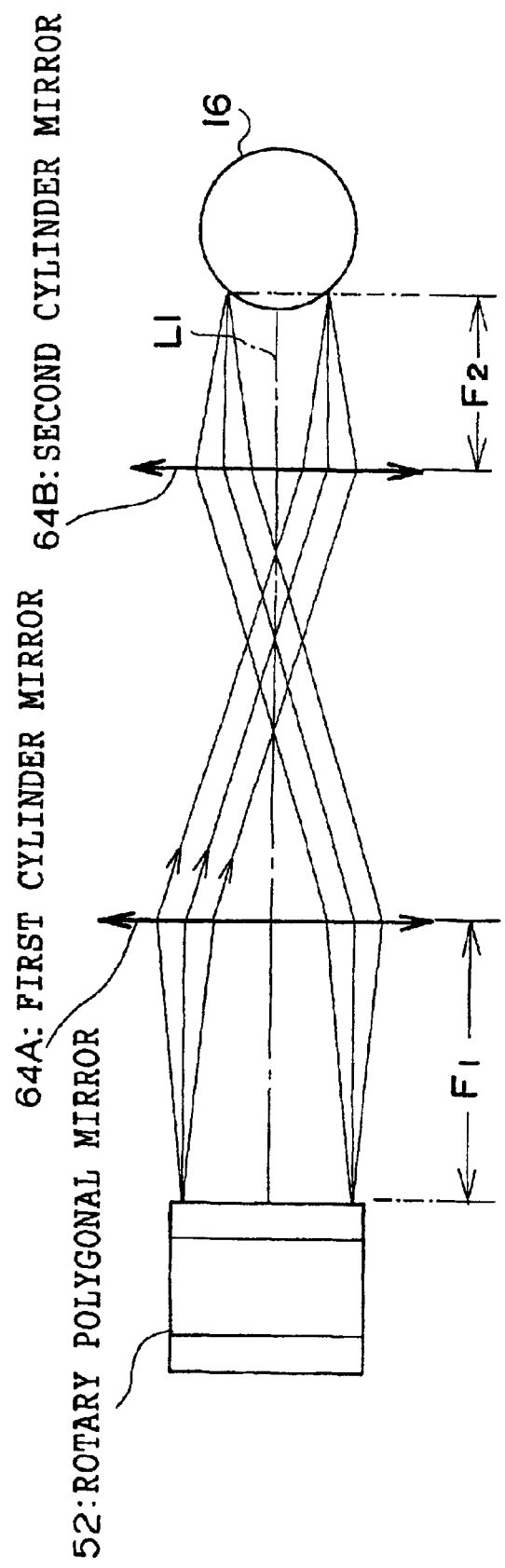
FIG. 6 is a block diagram showing an optical system from reflection surfaces of a rotary polygonal mirror to a photosensitive drum in a case in which the object side focal position of first cylinder mirror and the reflection surfaces of the rotary polygonal mirror coincide.

In this case, as shown in FIG. 6, the light beams LB emitted from the first cylinder mirror 64A are substantially parallel light in the subscanning direction. In the following explanation, the focal length of the first cylinder mirror 64A at this time is F1, and the focal length of the second cylinder mirror 64B is F2.

Figure 7:
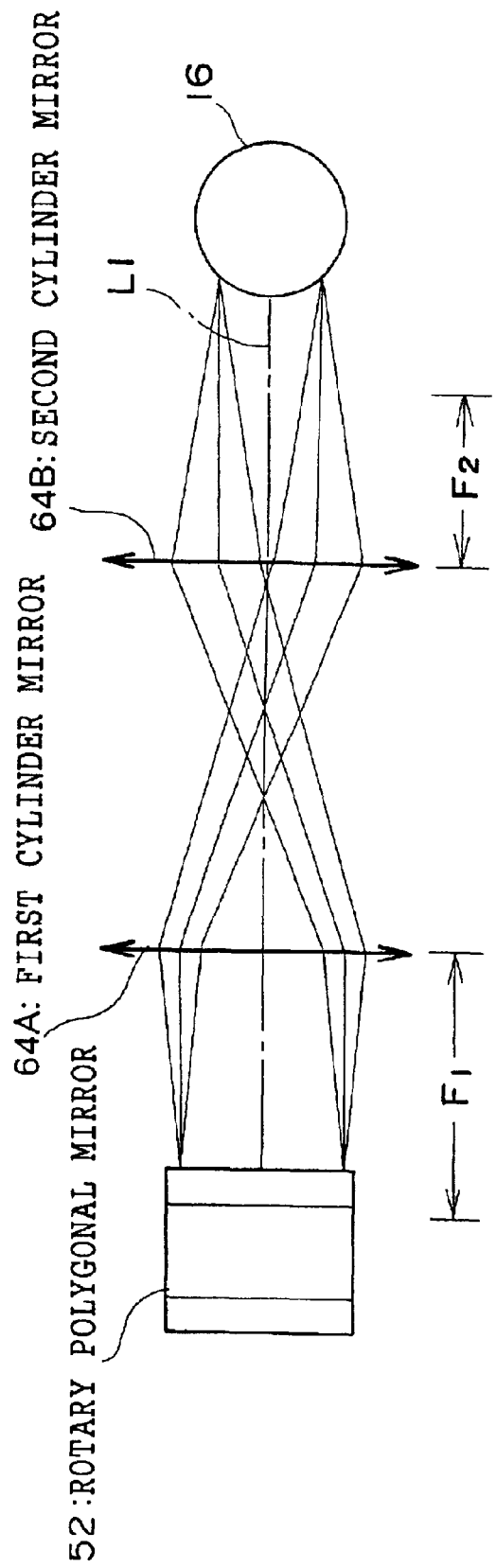
FIG. 7 is a block diagram showing an optical system from reflection surfaces of the rotary polygonal mirror to the photosensitive drum in a case in which the distance from the reflection surfaces of the rotary polygonal mirror to the first cylinder mirror is shorter than the object side focal length of the first cylinder mirror.

As in examples No. 4, 5, 6, when the focal length of the first cylinder mirror 64A is longer than F1, the optical path length between the rotary polygonal mirror 52 and the first cylinder mirror 64A is shorter than the focal length of the first cylinder mirror 64A, and the optical path length between the second cylinder mirror 64B and the photosensitive drum 16 is longer than the focal length of the second cylinder mirror 64B. In this case, as shown in FIG. 7, the exit light from the first cylinder mirror is divergent light, and the optical path length between the second cylinder mirror 64B and the photosensitive drum 16 is longer than F2.

Figure 8:
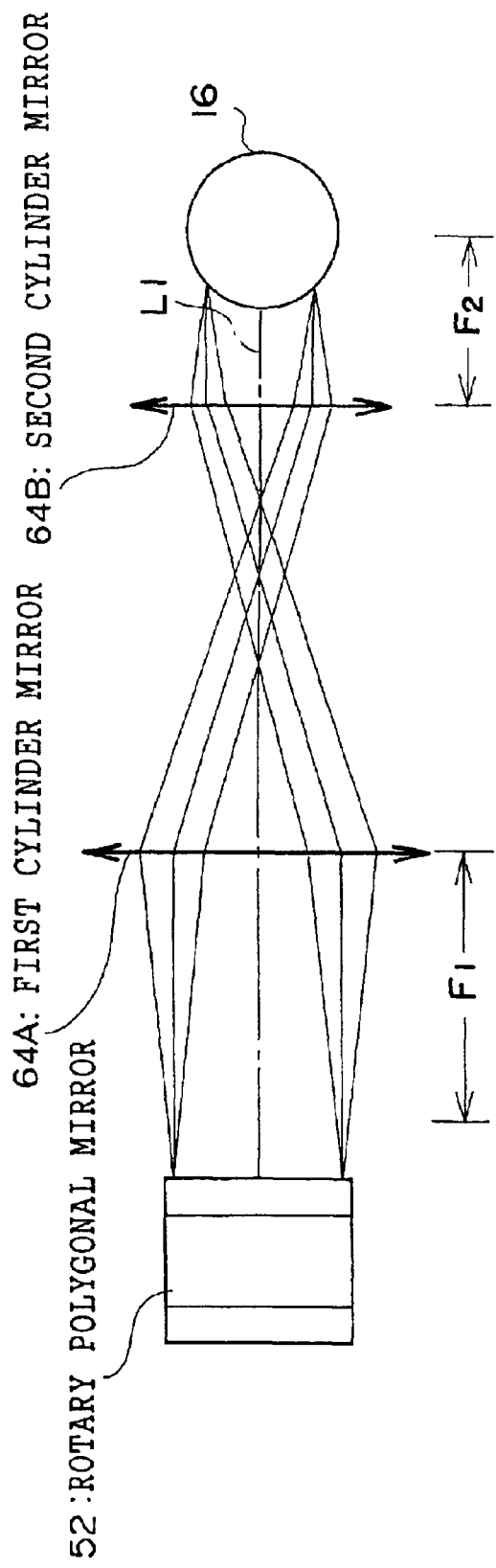
FIG. 8 is a block diagram showing an optical system from reflection surfaces of the rotary polygonal mirror to the photosensitive drum in a case in which the distance from the reflection surfaces of the rotary polygonal mirror to the first cylinder mirror is longer than the object side focal length of the first cylinder mirror.
Figure 9:
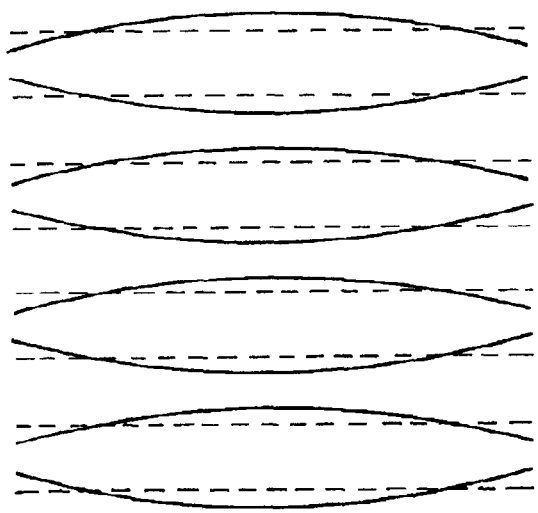
FIG. 9 is a diagram for explaining bow difference.
Figure 10:
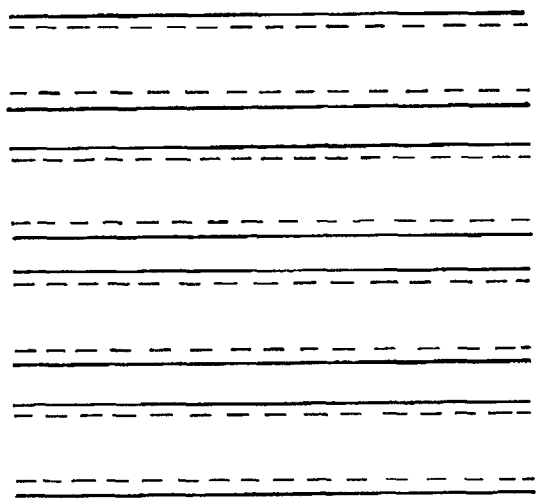
FIG. 10 is a diagram for explaining pitch deviation.
Figure 14:
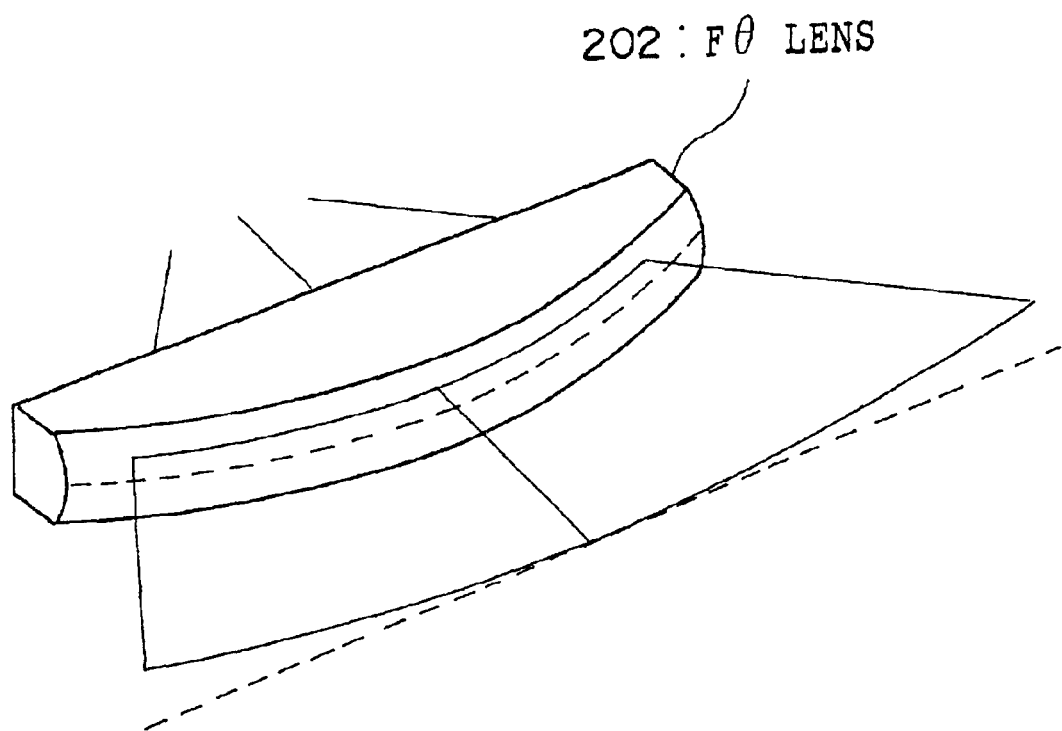
FIG. 14 is a diagram for explaining factors for causing bow difference due to transmission through an fθ lens.

On the other hand, as in examples No. 1, 2, when the focal length of the first cylinder mirror 64A is shorter than F1, the optical path length between the rotary polygonal mirror 52 and the first cylinder mirror 64A is longer than the focal length of the first cylinder mirror 64A, and the optical path length between the second cylinder mirror and the photosensitive drum 16 is shorter than the focal length of the second cylinder mirror 64B. In this case, as shown in FIG. 8, the exit light from the first cylinder mirror is condensed light, and the optical path length between the second cylinder mirror 64B and the photosensitive drum 16 is shorter than F2.

Thus, by selecting the relation between the object side focal position of the first cylinder mirror 64A and the reflection surface 52A of the rotary polygonal mirror 52, that is, by changing the convergent state of the light beams emitted from the first cylinder mirror 64A, the optical path length of the second cylinder mirror 64B and the photosensitive drum 16 can be adjusted without changing the optical path length and conjugate magnification (writing density in the subscanning direction) between the rotary polygonal mirror 52 and the photosensitive drum 16. In other words, in order to focus the light beams on the circumferential surface of the photosensitive drum 16 by using two cylinder mirrors, that is, the first and second cylinder mirrors 64A, 64B, it is possible to adjust the optical path length between the photosensitive drum 16 and the cylinder mirror (second cylinder mirror 64B).

If the optical path length or conjugate magnification between the rotary polygonal mirror 52 and the photosensitive drum 16 is changed, by changing the convergent state of the light beams emitted from the first cylinder mirror 64A, the optical path length between the second cylinder mirror 64B and the photosensitive drum 16 can be adjusted.

However, as in the present embodiment, if the fθ lens 62 does not have power in the subscanning direction, in order to decrease the image curvature in the subscanning direction to an extent that does not present problems in practice, it is desired to set the conjugate relation of the rotary polygonal mirror 52 and the photosensitive drum 16 in a reducing system (conjugate magnification <1), that is, the focal length of the second cylinder lens is shorter than the focal length of the first cylinder lens 60.

In this example, the optical system is composed of the fθ lens, first cylinder mirror and second cylinder mirror, but the present invention is not limited to this example. Instead of the fθ lens, an fθ mirror may be used, or at least one of the first and second cylinder mirrors may be replaced by a cylinder lens.

In the present embodiment, the light scanning device 18 according to the invention is used in the image forming apparatus 10, but the present invention is not limited to this embodiment alone. The present invention may be applied to any image forming apparatus for forming an image by scanning light beams.

What is claimed is:

1. A light scanning method comprising the steps of:
   (a) making plural light beams emitted from a light source incident at least onto reflection surfaces of a deflector in a mutually parallel state in a direction orthogonal to a main scanning direction;

(b) deflecting the plural light beams by said deflector; and (c) focusing the plural light beams deflected by said deflector on a surface to be scanned, with an afocal relation between the reflection surfaces of the deflector and the surface to be scanned in the direction orthogonal to the main scanning direction.

2. A light scanning device which deflects plural light beams emitted from a light source by making the light beams incident on reflection surfaces of a deflector, and scans the surface to be scanned simultaneously by the plural light beams deflected by the deflector, the device comprising:

(a) a first optical system for making the plural light beams incident at least onto the reflection surfaces of the deflector in a mutually parallel state in a direction orthogonal to a main scanning direction; and (b) a second optical system for focusing the plural light beams, which were deflected by the deflector, onto a surface to be scanned, with an afocal relation between the reflection surfaces of the deflector and the surface to be scanned in the direction orthogonal to the main scanning direction.

3. The light scanning devise of claim 2, wherein said light source emits the plural light beams in a mutually parallel state, and said first optical system sets an afocal and conjugate relation between said light source and the reflection surfaces of said deflector.

4. The light scanning device of claim 3, wherein said first optical system comprises a collimator lens for making the light beams emitted from the light source as divergent luminous flux into a substantially parallel luminous flux, and a cylinder lens having power for condensing into the direction orthogonal to the main scanning direction, and focusing the light beams made into substantially parallel luminous flux by the collimator lens as a line which is long in the main scanning direction on the reflection surfaces of the deflector, and said collimator lens and cylinder lens are disposed such that a focal position at a light beam advancing direction downstream side of the collimator lens substantially coincides with a focal position at a light beam advancing direction upstream side of the cylinder lens.

5. The light scanning device of claim 2, wherein said second optical system focuses the plural light bears deflected by said deflector on the surface to be scanned, while setting a conjugate relation between the reflection surfaces of the deflector and the surface to be scanned.

6. The light scanning device of claim 5, wherein said second optical system, comprises an fθ optical system having power for condensing only in the main scanning direction, a first cylinder optical system having power for condensing in the direction orthogonal to the main scanning direction, and a second cylinder optical system having power for condensing in the direction orthogonal to the main scanning direction, and said first cylinder optical system and second cylinder optical system are disposed such that a focal position at a light beam advancing direction downstream side of the first cylinder optical system substantially coincides with a focal position at a light beam advancing direction upstream side of the second cylinder optical system.

7. The light scanning device of claim 6, wherein the power of said first cylinder optical system for condensing in the direction orthogonal to the main scanning direction is smaller than the power of said second cylinder optical system for condensing in the direction orthogonal to the main scanning direction.

8. The light scanning device of claim 2, wherein said light source is a vertical cavity surface emitting laser diode array having plural light emission points disposed in a two-dimensional arrangement.

9. A light scanning device comprising: a light source;

a deflector for deflecting plural light beams emitted from said light source toward a surface to be scanned, a first optical system including a collimator lens for making the light beams emitted from the light source as divergent luminous flux into substantially parallel luminous flux, and a cylinder lens having power for condensing in a direction orthogonal to a main scanning direction, and focusing the light beams made into substantially parallel luminous flux by the collimator lens as a line which is long in the main scanning direction on the reflection surfaces of the deflector; and a second optical system including an fθ optical system having power for condensing only in the main scanning direction, a first cylinder optical system having power for condensing in the direction orthogonal to the main scanning direction, and a second cylinder optical system having power for condensing in the direction orthogonal to the main scanning direction, wherein said first optical system sets an afocal and conjugate relation between the light source and reflection surfaces of the deflector, and said second optical system focuses the plural light beams deflected by said deflector onto the surface to be scanned while setting an afocal and conjugate relation between the reflection surfaces of the deflector and the surface to be scanned.

10. The light scanning device of claim 9, wherein said deflector is a rotary polygonal mirror rotating at a predetermined speed.

* * * * *